US012609486B2

(12) United States Patent
Giga et al.

(10) Patent No.: US 12,609,486 B2
(45) Date of Patent: Apr. 21, 2026

(54) LEVER-TYPE CONNECTOR

(71) Applicant: SUMITOMO WIRING SYSTEMS, LTD., Mie (JP)

(72) Inventors: Ryousuke Giga, Mie (JP); Yuki Horiguchi, Mie (JP); Shoma Seki, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 306 days.

(21) Appl. No.: 18/273,424

(22) PCT Filed: Jan. 11, 2022

(86) PCT No.: PCT/JP2022/000456

§ 371 (c)(1),
(2) Date: Jul. 20, 2023

(87) PCT Pub. No.: WO2022/163334

PCT Pub. Date: Aug. 4, 2022

(65) Prior Publication Data

US 2024/0014598 A1 Jan. 11, 2024

(30) Foreign Application Priority Data

Jan. 28, 2021 (JP) ................................ 2021-012002

(51) Int. Cl.
*H01R 13/629* (2006.01)
*H01R 13/641* (2006.01)

(52) U.S. Cl.
CPC . *H01R 13/62955* (2013.01); *H01R 13/62938* (2013.01); *H01R 13/641* (2013.01)

(58) Field of Classification Search
CPC ........ H01R 13/62955; H01R 13/62938; H01R 13/641

(Continued)

(56) References Cited

U.S. PATENT DOCUMENTS 5,735,702 A * 4/1998 Hio .................. H01R 13/62955 439/468
7,481,661 B2 * 1/2009 Takahashi ........ H01R 13/62933 439/372

(Continued)

FOREIGN PATENT DOCUMENTS

JP H11-185872 A 7/1999
JP 2000-012154 A 1/2000

(Continued)

OTHER PUBLICATIONS

International Search Report issued on Apr. 5, 2022 for WO 2022/163334 A1 (6 pages).

*Primary Examiner* — Tulsidas C Patel
*Assistant Examiner* — Thaslimur Rahman
(74) *Attorney, Agent, or Firm* — Venjuris, P.C.

(57) ABSTRACT

A lever-type connector is provided with a housing including a terminal holding portion having wire draw-out surfaces, lever holding walls disposed on both sides of the terminal holding portion and rotary shafts projecting from the lever holding walls toward the terminal holding portion, a lever including leg portions disposed between the respective lever holding walls and the terminal holding portion and having shaft holes for receiving the rotary shafts, the lever being rotatable from a connection initial position to a connection completion position, and a cover for covering the wire draw-out surfaces, by being assembled with the housing. The cover includes an extended wall portion extending along the terminal holding portion from a position adjacent to the wire draw-out surfaces, and the extended wall portion has an outer surface for restricting deformation of the leg portion by coming into contact with the leg portion.

5 Claims, 24 Drawing Sheets

(58) Field of Classification Search
USPC .......................................................... 439/372
See application file for complete search history.

(56) References Cited

U.S. PATENT DOCUMENTS

| | | | | |
|---|---|---|---|---|
| 2003/0190836 | A1 | 10/2003 | Yamashita | |
| 2006/0040535 | A1 * | 2/2006 | Koshy ............. | H01R 13/62977 439/157 |
| 2007/0010113 | A1 | 1/2007 | Fukatsu et al. | |
| 2007/0298637 | A1 | 12/2007 | Matsuura et al. | |
| 2009/0221167 | A1 * | 9/2009 | Pittenger .......... | H01R 13/62933 439/465 |

FOREIGN PATENT DOCUMENTS

| | | | |
|---|---|---|---|
| JP | 2001-326023 | A | 11/2001 |
| JP | 2005-085670 | A | 3/2005 |
| JP | 2005-243276 | A | 9/2005 |
| JP | 2013-048020 | A | 3/2013 |
| JP | 2015-118830 | A | 6/2015 |
| JP | 2018-106802 | A | 7/2018 |

* cited by examiner

LEVER-TYPE CONNECTOR

CROSS REFERENCE TO RELATED APPLICATIONS

This application is a national phase of PCT application No. PCT/JP2022/000456, filed on 11 Jan. 2022, which claims priority from Japanese patent application No. 2021-012002, filed on 28 Jan. 2021, all of which are incorporated herein by reference.

TECHNICAL FIELD

A technique disclosed by this specification relates to a lever-type connector.

BACKGROUND

A lever-type connector is provided with a lever for assisting connection to and separation from a mating connector by the principle of leverage. A lever-type connector of this type is, for example, provided with two cover portions (lever holding walls), two lever rotary shafts (rotary shafts) projecting inward from the respective two cover portions, and a holder for holding the lever. The lever includes rotation holes (shaft holes) and two lever portions (leg portions) supported along the respective two cover portions (see, Patent Document 1).

PRIOR ART DOCUMENT

Patent Document

Patent Document 1: JP 2005-243276 A

SUMMARY OF THE INVENTION

Problems to be Solved

In the lever-type connector configured as described above, the lever portions (leg portions) may be easily deflected due to manufacturing tolerances and the like. In such a case, there is a concern that the lever is detached in an unintended situation such as during the transportation or use of the connector or during connection to a mating connector.

Means to Solve the Problem

A lever-type connector disclosed by this specification is provided with a housing including a terminal holding portion having a wire draw-out surface and a cavity open in the wire draw-out surface, lever holding walls disposed on both sides of the terminal holding portion and rotary shafts projecting from the lever holding walls toward the terminal holding portion, a lever including leg portions disposed between the respective lever holding walls and the terminal holding portion and having shaft holes for receiving the rotary shafts, the lever being rotatable from a connection initial position to a connection completion position, and a cover for covering the wire draw-out surface by being assembled with the housing, the cover including an extended wall portion extending along the terminal holding portion from a position adjacent to the wire draw-out surface, the extended wall portion having an outer surface for restricting deformation of the leg portion by coming into contact with the leg portion.

Effect of the Invention

According to the lever-type connector disclosed by this specification, the detachment of the lever from the housing can be avoided in an unintended situation.

DETAILED DESCRIPTION TO EXECUTE THE INVENTION

Figure 1:
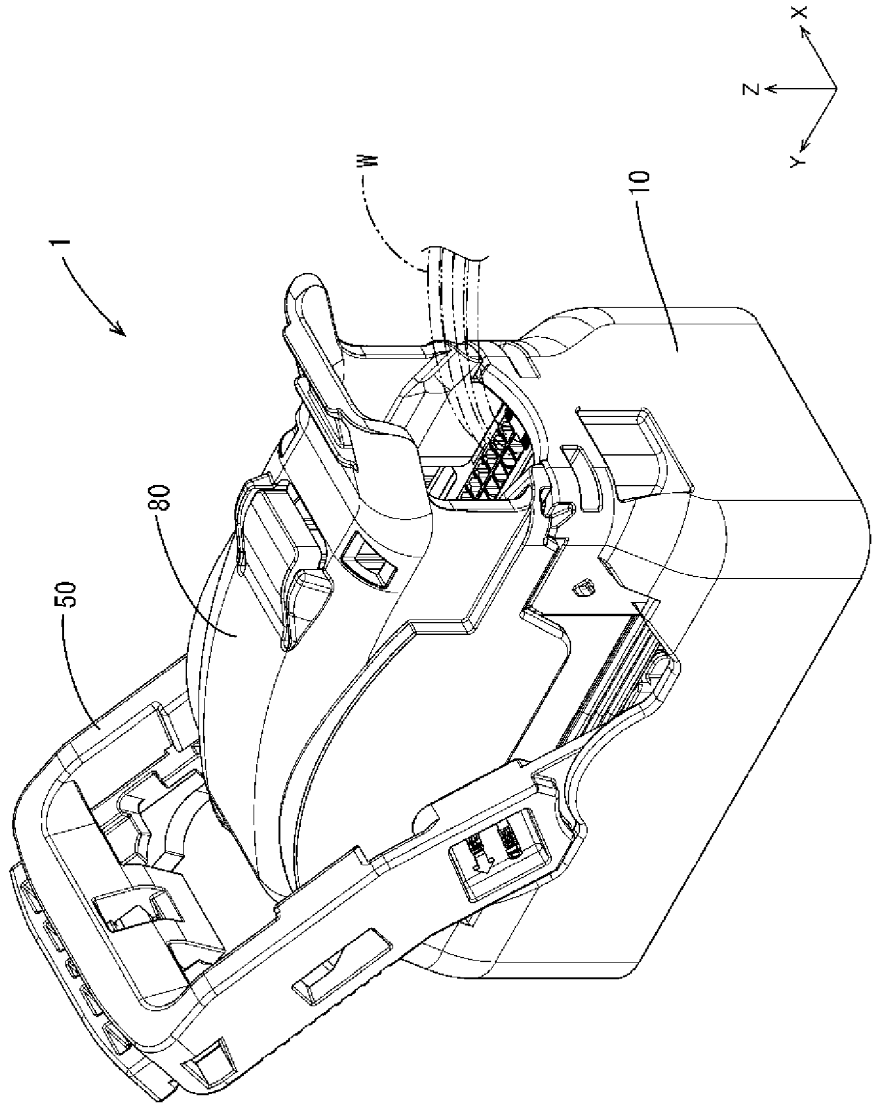
FIG. 1 is a perspective view of a lever-type connector of an embodiment.

Summary of Embodiments (1) The lever-type connector disclosed by this specification is provided with a housing including a terminal holding portion having a wire draw-out surface and a cavity open in the wire draw-out surface, lever holding walls disposed on both sides of the terminal holding portion and rotary shafts projecting from the lever holding walls toward the terminal holding portion, a lever including leg portions disposed between the respective lever holding walls and the terminal holding portion and having shaft holes for receiving the rotary shafts, the lever being rotatable from a connection initial position to a connection completion position, and a cover for covering the wire draw-out surface by being assembled with the housing, the cover including an extended wall portion extending along the terminal holding portion from a position adjacent to the wire draw-out surface, the extended wall portion having an outer surface for restricting deformation of the leg portion by coming into contact with the leg portion.

According to the above configuration, the outer surface of the extended wall portion comes into contact with the leg portion to restrict the deformation of the leg portion, whereby the detachment of the lever is avoided in an unintended situation such as during the transportation or use of the lever-type connector or during connection to a mating connector.

(2) In the lever-type connector of (1) described above, the extended wall portion may have an inner surface to be disposed along the terminal holding portion.

According to this configuration, the inner surface of the extended wall portion extends along the terminal holding portion in assembling the cover with the housing, whereby the assembly of the cover with the housing is guided. Thus, the cover can be smoothly assembled with the housing.

(3) In the lever-type connector of (1) or (2) described above, the housing may include a retaining projection arranged adjacent to a projecting end of the rotary shaft, the retaining projection projecting from an outer peripheral surface of the rotary shaft, the retaining projection restricting separation of the rotary shaft from the shaft hole by locking a peripheral edge part of the shaft hole in the leg portion, and the lever may include a recess in the peripheral edge part of the shaft hole, the recess communicating with the shaft hole, the recess allowing passage of the retaining projection only when the lever is at an assembly position between the connection initial position and the connection completion position.

In the above configuration, when the lever is at the assembly position between the connection initial position and the connection completion position, the attachment and detachment of the lever are allowed. In such a case, there is a concern that the lever is detached while being rotated between the connection initial position and the connection completion position. In such a configuration, if a configuration for restricting the deformation of the leg portion by the extended wall portion is applied, it is preferable since accidental detachment of the lever during connection to the mating connector is avoided.

(4) In the lever-type connector of (1), (2) or (3) described above, the lever may include a guide portion, and the cover may include a guide receiving portion extending along a rotation path of the guide portion when the lever rotates from the connection initial position to the connection completion position, the guide receiving portion coming into contact with the guide portion.

According to this configuration, the guide portion is guided by the guide receiving portion, whereby the lever is smoothly rotated from the connection initial position to the connection completion position.

(5) In the lever-type connector of (4) described above, the lever may include a lever body and a connection detecting member to be assembled with the lever body movably between a standby position and a detection position, the guide portion being provided on the connection detecting member, and the guide receiving portion may be disposed at such a position as to restrict a movement of the connection detecting member from the standby position to the detection position by coming into contact with the guide portion when the lever is at a position other than the connection completion position and not to be in contact with the guide portion when the lever is at the connection completion position.

According to this configuration, since the guide receiving portion has both a function of guiding the rotation of the lever and a function of restricting the movement of the connection detecting member from the standby position to the detection position when the lever is at a position other than the connection completion position, the configuration can be simplified.

DETAILS OF EMBODIMENT

A specific example of the technique disclosed by this specification is described below with reference to the drawings. Note that the present invention is not limited to these illustrations, but is represented by claims and intended to include all changes in the scope of claims and in the meaning and scope of equivalents.

EMBODIMENT

Figure 2:
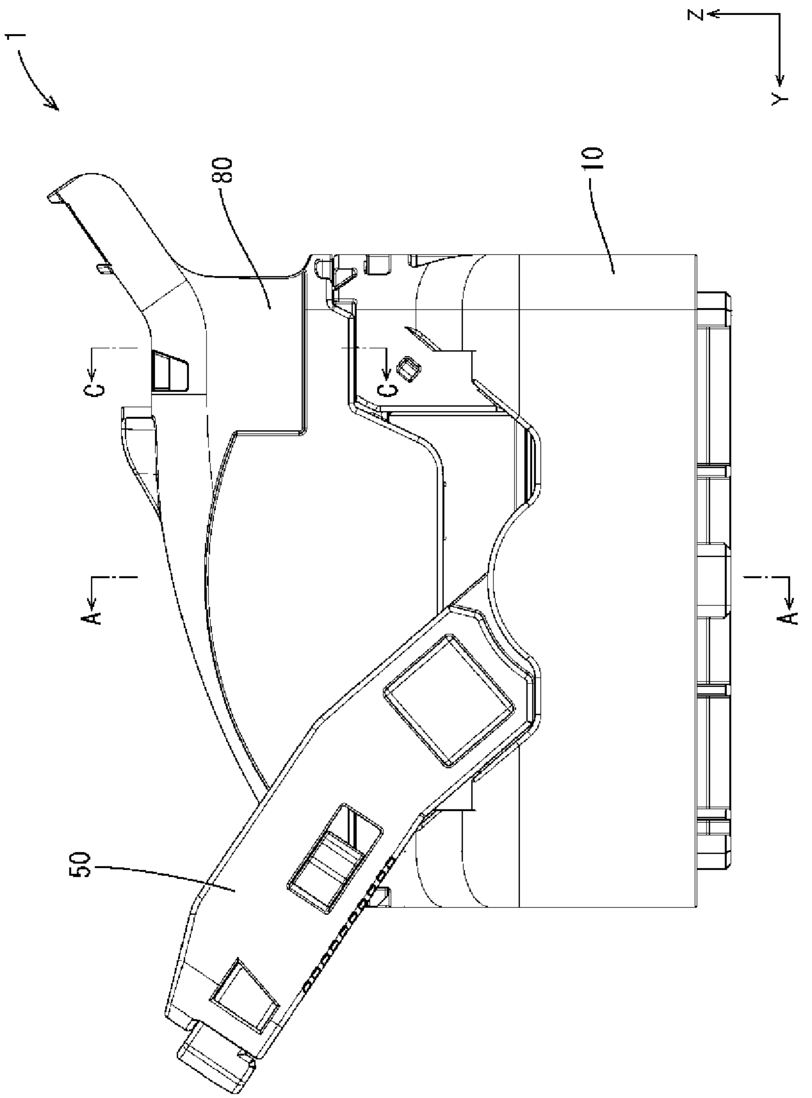
FIG. 2 is a side view of the lever-type connector of the embodiment.

An embodiment is described with reference to FIGS. 1 to 24. A lever-type connector 1 of this embodiment is a female connector to be connected to a mating male connector 100. As shown in FIGS. 1 and 2, the lever-type connector 1 is provided with a housing 10 for holding wires W connected to terminal fittings at ends, a lever 50 to be assembled with the housing 10 and a cover 80 to be likewise assembled with the housing 10.

[Housing 10]

Figure 3:
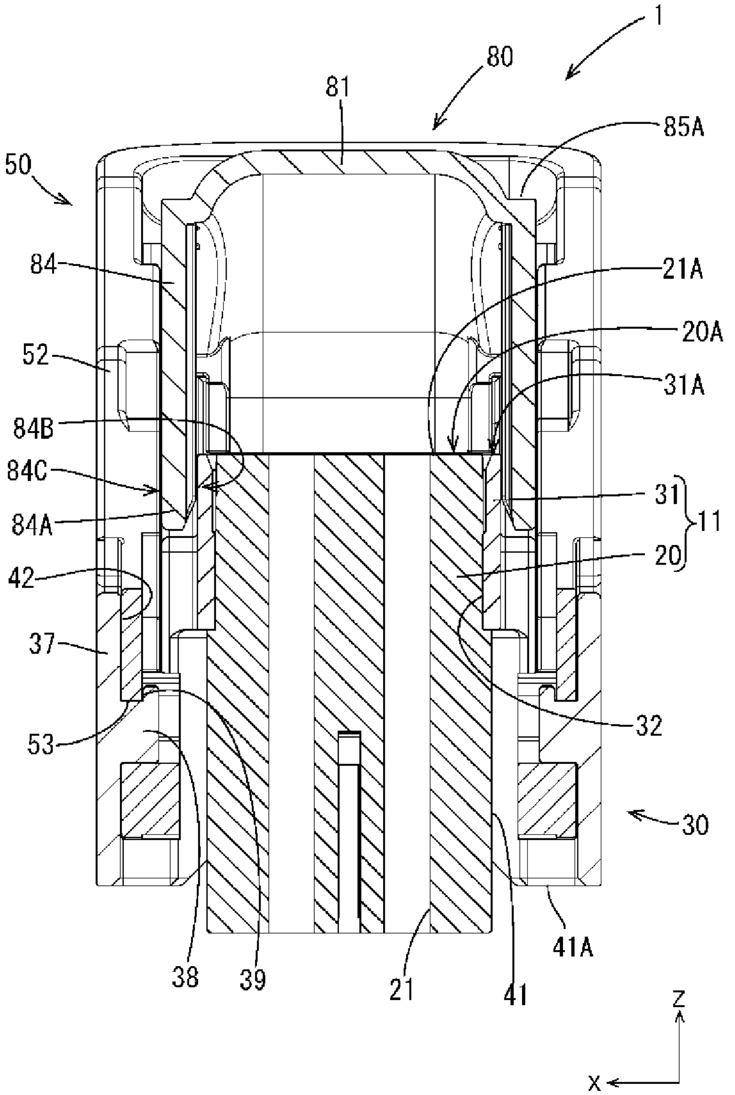
FIG. 3 is a section along A-A of FIG. 2.
Figure 4:
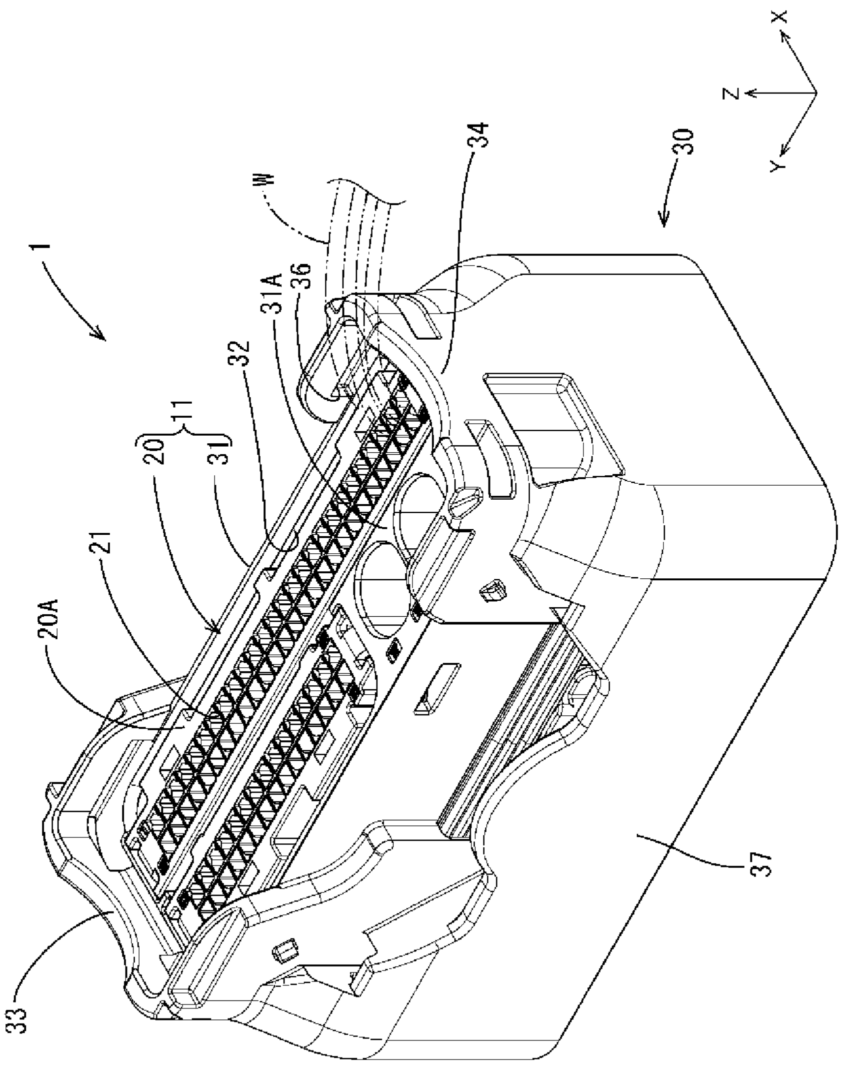
FIG. 4 is a perspective view of a housing of the embodiment.

The housing 10 is made of synthetic resin and, as shown in FIGS. 3 and 4, provided with an inner housing 20 for holding the wires W and an outer housing 30 for holding the inner housing 20.

As shown in FIGS. 3 and 4, the inner housing 20 includes a first wire drawn-out surface 20A and a plurality of cavities 21 having wire drawn-out openings 21A in the first wire drawn-out surface 20A. The terminal fitting and an end part of the wire W connected to the terminal fitting can be accommodated inside each cavity 21. As shown in FIGS. 1 and 4, the wires W extend to the outside of the inner housing 20 from the wire drawn-out openings 21A. Note that, in FIGS. 1 and 4, only some wires W drawn out from some wire drawn-out openings 21A are shown and the other wires are not shown.

As shown in FIGS. 3, 4, 5 and 6, the outer housing 30 is provided with an inner holding portion 31, a first cover holding wall 33, a second cover holding wall 34, two lever holding walls 37 and two rotary shafts 38. The inner holding portion 31 has a rectangular parallelepiped shape long in one direction (lateral direction of FIG. 5) as a whole and includes, as shown in FIGS. 3 and 4, a first wire draw-out surface 31A and an inner accommodating portion 32 open in the second wire draw-out surface 31A. The inner housing 20 is accommodated in the inner accommodating portion 32. The first wire draw-out surface 20A of the inner housing 20 is disposed to be flush with the second wire draw-out surface 31A. The inner holding portion 31 and the inner housing 20 constitute a terminal holding portion 11.

Figure 7:
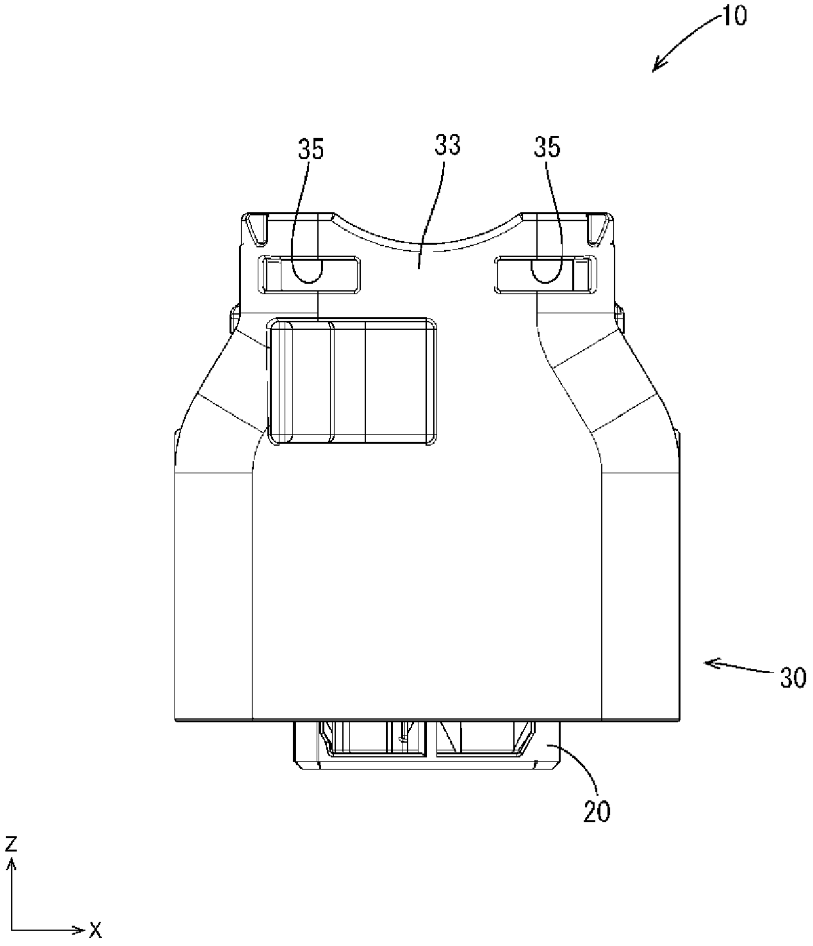
FIG. 7 is a back view of the housing of the embodiment.
Figure 18:
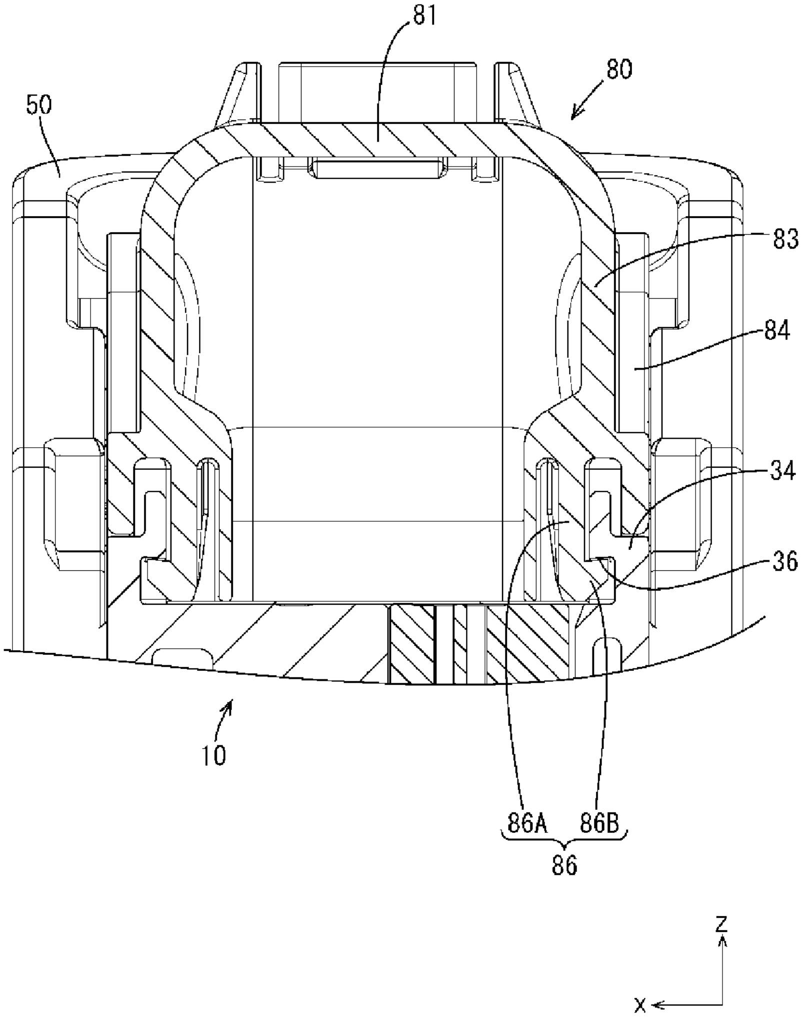
FIG. 18 is a section along C-C of FIG. 2.

As shown in FIG. 4, the two cover holding walls 33, 34 are U-shaped and arranged to face each other. The first cover holding wall 33 is connected to one end part of the inner holding portion 31 at a position adjacent to the second wire draw-out surface 31A. The second cover holding wall 34 is connected to the other end part of the inner holding portion 31 at a position adjacent to the second wire draw-out surface 31A. The first cover holding wall 33 includes a part projecting further than the second wire draw-out surface 31A as shown in FIG. 4, and two locking holes 35 for engagement with the cover 80 are disposed in this part as shown in FIG. 7. The second cover holding wall 34 includes a part projecting further than the second wire draw-out surface 31A as shown in FIG. 4, and two locking recesses 36 for engagement with the cover 80 are disposed in this part as shown in FIGS. 4 and 18.

As shown in FIGS. 3, 4, 5 and 6, the two lever holding walls 37 are arranged to face each other on both sides of the terminal holding portion 11 while being perpendicular to the wire draw-out surfaces 20A, 31A. One end of each lever holding wall 37 is connected to the first cover holding wall 33, and the other end thereof is connected to the second cover holding wall 34, and each lever holding wall 37 is spaced apart from the terminal holding portion 11.

Figure 5:
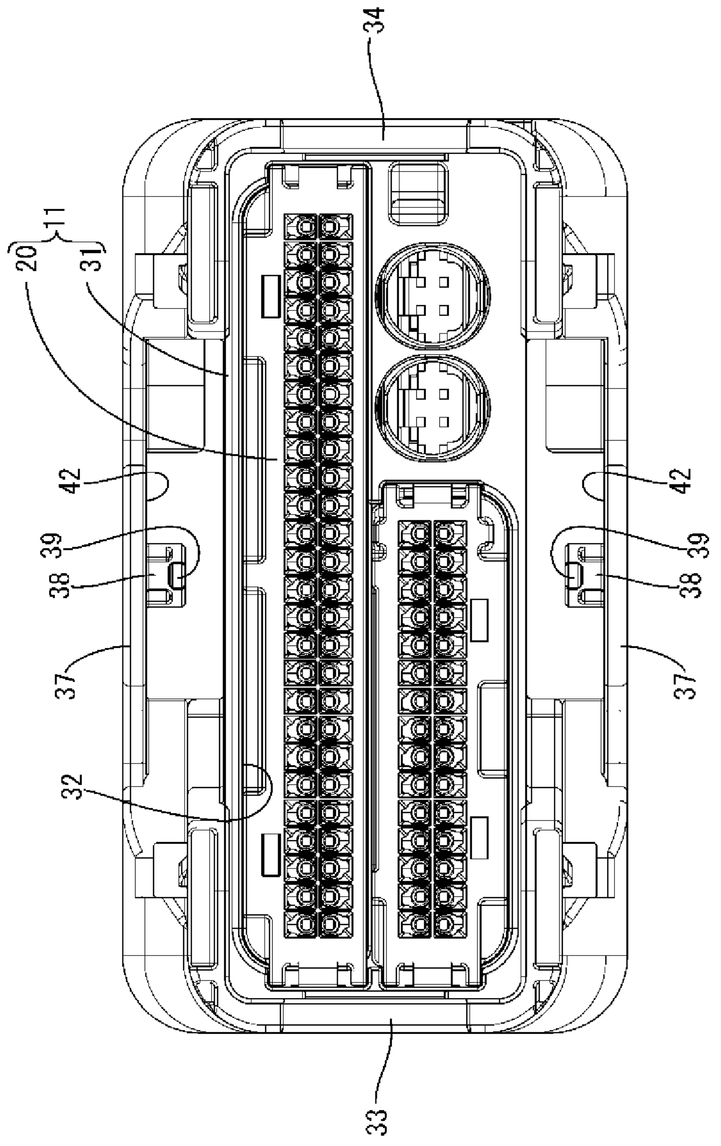
FIG. 5 is a plan view of the housing of the embodiment.
Figure 6:
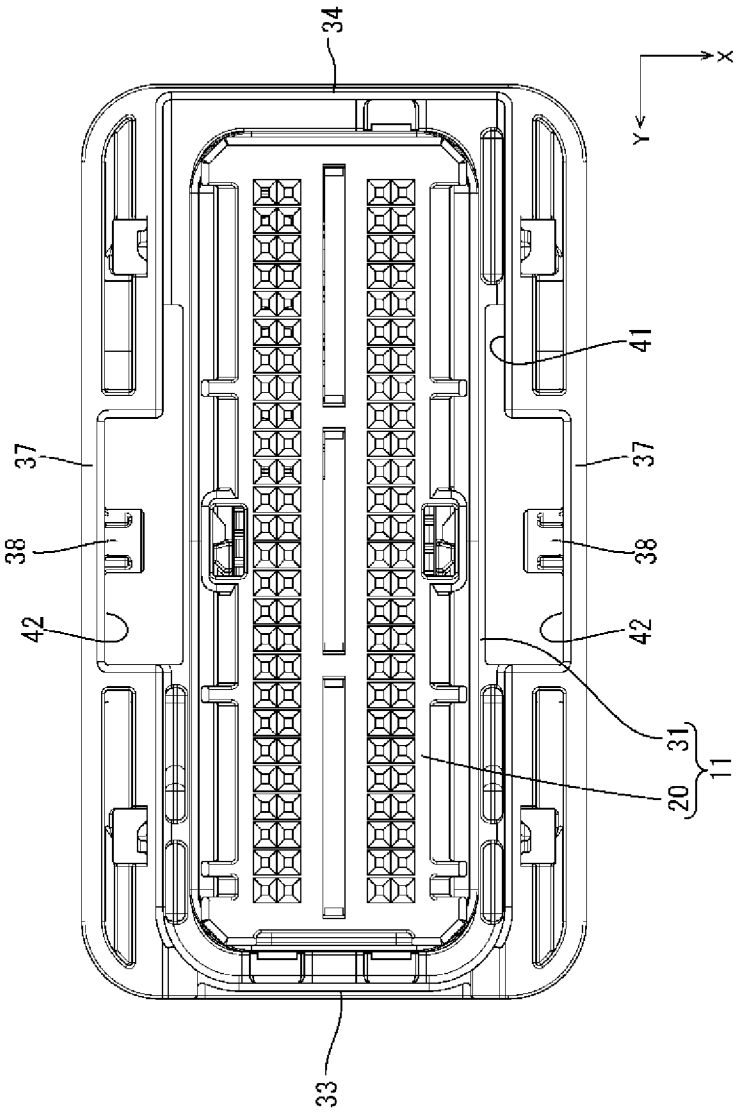
FIG. 6 is a bottom view of the housing of the embodiment.

A space defined by the terminal holding portion 11, the two cover holding walls 33, 34 and the two lever holding walls 37 serves as a connection space 41 having a connection opening 41A enabling the entrance of the mating connector 100 on a side opposite to the wire draw-out surfaces 20A, 31A as shown in FIGS. 3 and 6. Further, a part of a space defined by each of the two lever holding wall 37 and the terminal holding portion 11 has openings on the side of the wire draw-out surfaces 20A and 31A and an opposite side thereof and serves as a lever accommodating portion 42 for allowing the entrance of a part of a leg portion 52 of the lever 50 as shown in FIGS. 3, 5 and 6.

Figure 16:
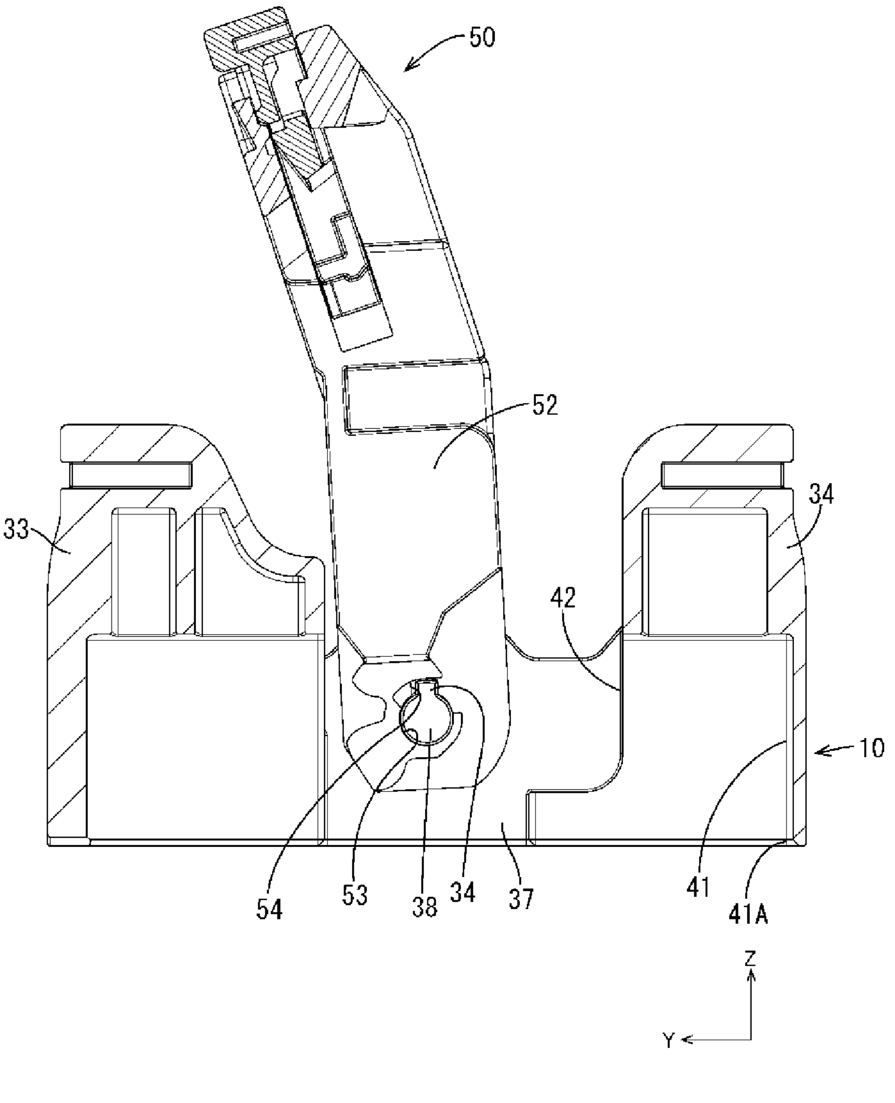
FIG. 16 is a section showing a state where the lever is assembled with the housing in the embodiment.

Each of the two rotary shafts 38 is a cylindrical shaft for rotatably supporting the lever 50 and projects from the lever holding wall 37 toward the terminal holding portion 11 as shown in FIGS. 3, 5 and 16. A retaining projection 39 for retaining the lever 50 projects from each of the two rotary shafts 38. The retaining projection 39 is arranged adjacent to the projecting end of the rotary shaft 38.

[Lever 50]

The lever 50 is a member for assisting the connection and the separation of the housing 10 to and from the mating connector 100. The lever 50 is made of synthetic resin and, as shown in FIG. 8, provided with a lever body 51 to be rotatably assembled with the housing 10 and a connection detecting member 71 for confirming the connection completion of the housing 10 to the mating connector 100 by being assembled with the lever body 51.

Figure 8:
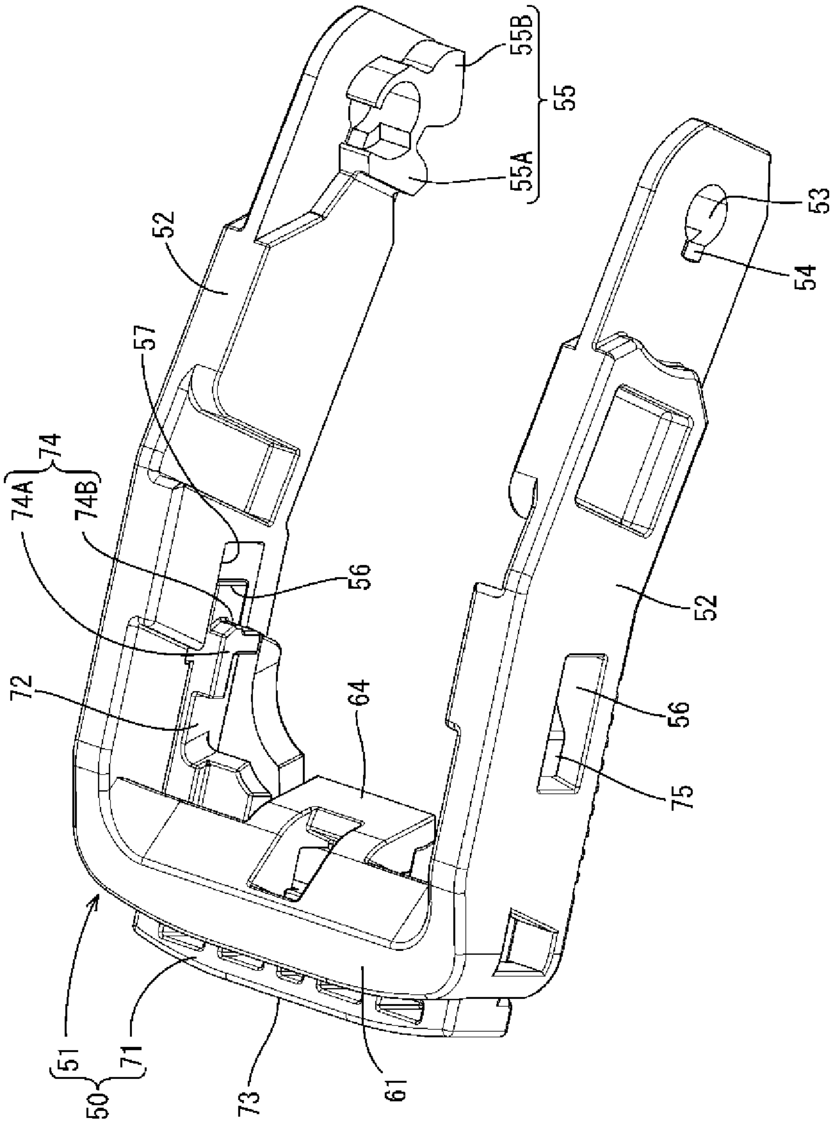
FIG. 8 is a perspective view of a lever of the embodiment.

As shown in FIG. 8, the lever body 51 includes two leg portions 52 and a rotation operating portion 61 coupling end parts of the two leg portions 52.

Figure 9:
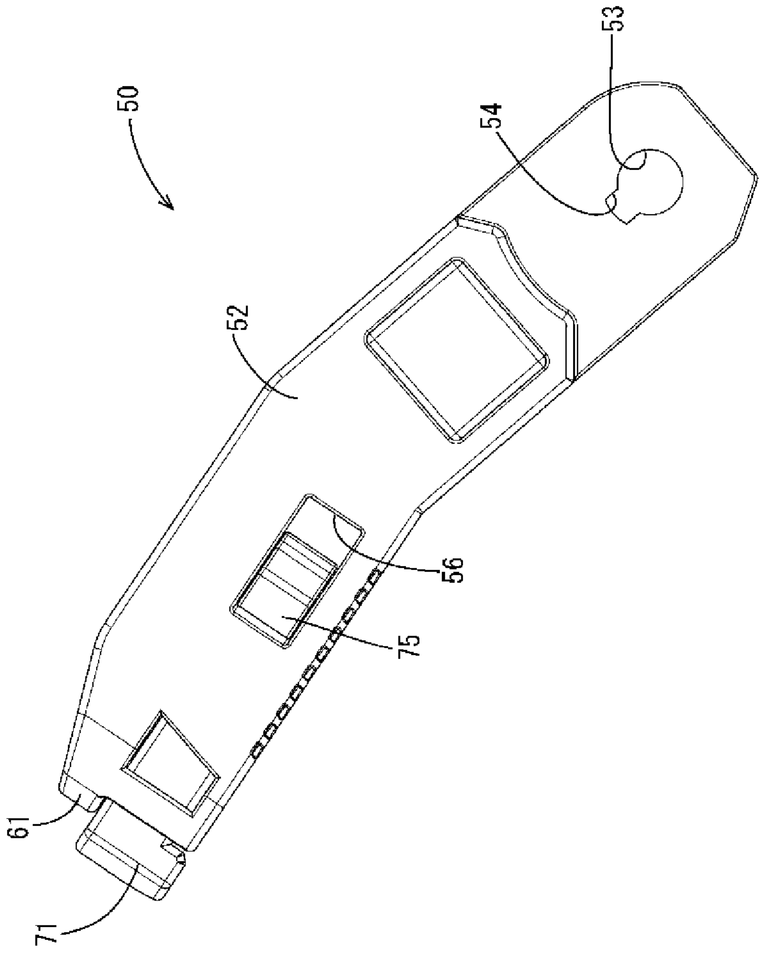
FIG. 9 is a side view of the lever of the embodiment.
Figure 11:
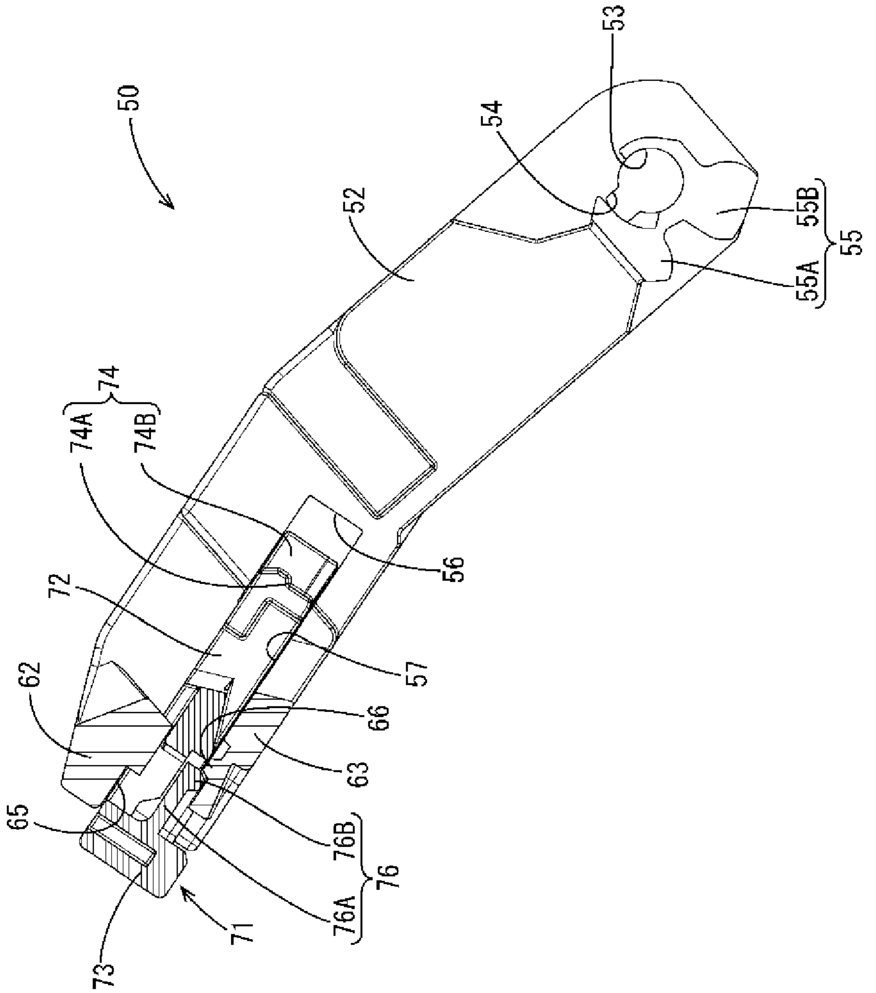
FIG. 11 is a section along B-B of FIG. 10.

The two leg portions 52 are respectively in the form of an elongated plate as shown in FIG. 8 and arranged to face each other on both sides of the terminal holding portion 11 as shown in FIG. 3. Tip parts of the two leg portions 52 are respectively accommodated into the two lever accommodating portions 42 and arranged along the two lever holding walls 37 as shown in FIG. 3. As shown in FIGS. 8, 9 and 11, each leg portion 52 includes a shaft hole 53 for receiving the rotary shaft 38, a gear portion 55 disposed around the shaft hole 53, a holding hole 56 for holding the connection detecting member 71 and a slide groove 57.

Figure 10:
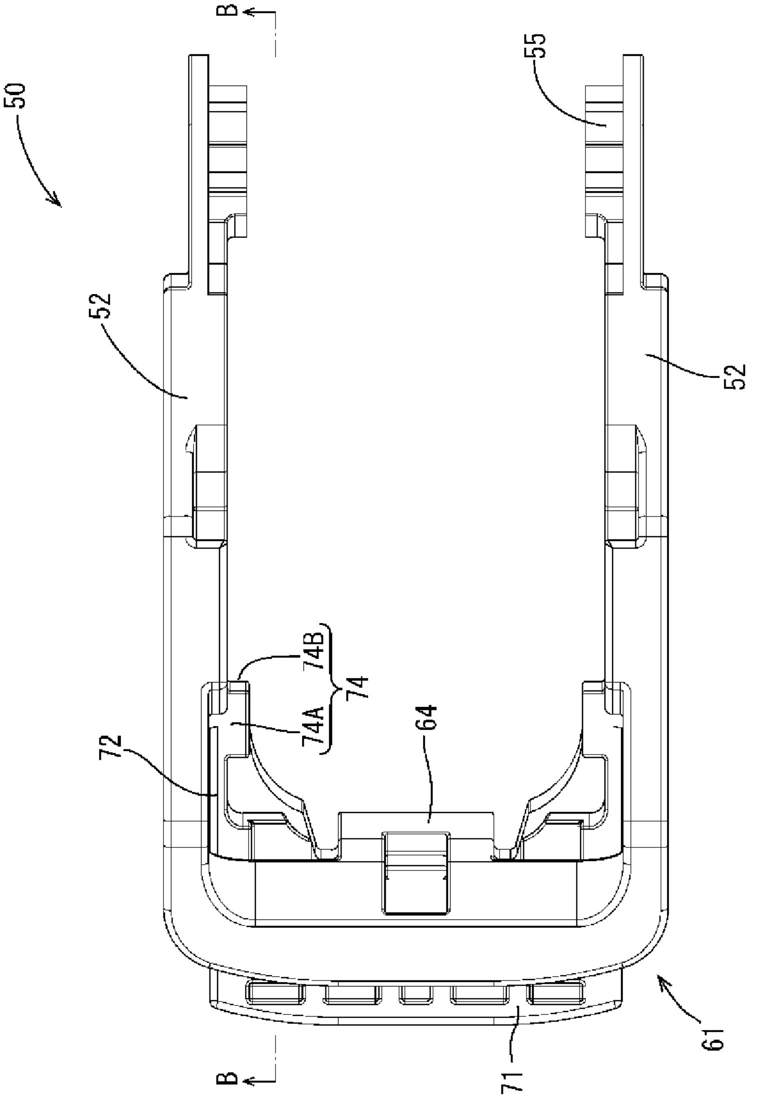
FIG. 10 is a plan view of the lever of the embodiment.

As shown in FIGS. 8, 9 and 11, the shaft hole 53 is a circular hole disposed in a tip part opposite to the rotation operating portion 61 in the leg portion 52. A passage recess 54 (an example of a recess) communicating with the shaft hole 53 and allowing the passage of the retaining projection 39 is disposed in a peripheral edge part of the shaft hole 53. As shown in FIGS. 8, 10 and 11, the gear portion 55 is disposed on an inner surface facing the terminal holding portion 11 in the leg portion 52 and includes a first gear tooth 55A and a second gear tooth 55B radially extending from the shaft hole 53 as a center. The first and second gear teeth 55A, 55B are arranged at intervals. As shown in FIGS. 8 and 9, the holding hole 56 is an elongated through hole arranged at a position closer to the rotation operating portion 61 than the shaft hole 53 in the leg portion 52. As shown in FIGS. 8 and 11, the slide groove 57 is a groove arranged at a position adjacent to the rotation operating portion 61 in the inner surface of the leg portion 52 and extending to a position somewhat closer to a tip than the holding hole 56.

As shown in FIGS. 10 and 11, the rotation operating portion 61 includes first and second bridging portions 62, 63 linking the end parts of the two leg portions 52 and a third bridging portion 64 linking the first and second bridging portions 62, 63 at a center position between the two leg portions 52. A space defined by the three bridging portions 62, 63 and 64 serves as a detecting member accommodating portion 65 for accommodating the connection detecting member 71. As shown in FIG. 11, the second bridging portion 63 includes two detecting projections 66 projecting into the detecting member accommodating portion 65 to be respectively engaged with two detecting pieces 76 of the connection detecting member 71 to be described later.

Figure 12:
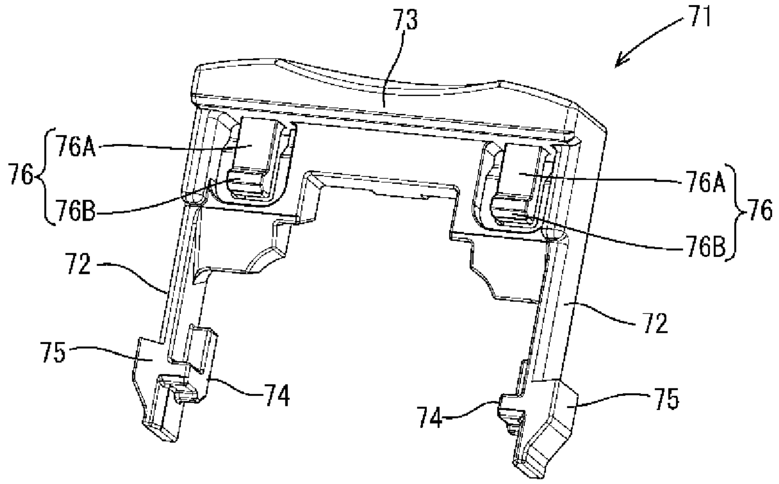
FIG. 12 is a perspective view of a connection detecting member of the embodiment.

As shown in FIG. 12, the connection detecting member 71 includes two arms 72 arranged to face each other, a push-in operating portion 73 coupling end parts of the two arms 72, guide portions 74 and holding projections 75 respectively projecting from the two arms 72, and the two detecting pieces 76 projecting from the push-in operating portion 73 and disposed between the two arms 72.

As shown in FIGS. 8, 10, 11 and 12, the guide portion 74 is located in proximity to a tip opposite to the push-in operating portion 73 in the arm 72 and includes a guide body 74A and a contact portion 74B. The guide body 74A is an L-shaped projection projecting from an inner surface facing the mating arm 72 in each arm 72. The contact portion 74B is a small projection projecting from the guide body 74A toward the tip of the arm 72. As shown in FIGS. 8 and 12, the holding projection 75 is a projection located adjacent to the tip of the arm 72 and projecting from an outer surface opposite to the inner surface in the arm 72. As shown in FIGS. 11 and 12, the detecting piece 76 includes a plate-like detecting piece body 76A extending from the push-in operating portion 73 and a detecting claw 76B projecting from the tip of the detecting piece body 76A and to be engaged with the detecting projection 66.

As shown in FIGS. 8 and 11, parts of the push-in operating portion 73 and the arms 72 are accommodated in the detecting member accommodating portion 65, and the two arms 72 are respectively slidably accommodated in the two slide grooves 57. As shown in FIGS. 8 and 10, the guide portion 74 is disposed to project from the inner surface of the leg portion 52. As shown in FIG. 9, the two holding projections 75 are respectively accommodated inside the two holding holes 56 and locked to hole walls of the holding holes 56, whereby the connection detecting member 71 is held in the lever body 51. The connection detecting member 71 is displaceable between a standby position (position shown in FIG. 11) where a part of the push-in operating portion 73 projects from the rotation operating portion 61 and a detection position (position shown in FIG. 23) where the entire push-in operating portion 73 is accommodated inside the detecting member accommodating portion 65 and does not protrude out from the rotation operating portion 61.

Figure 22:
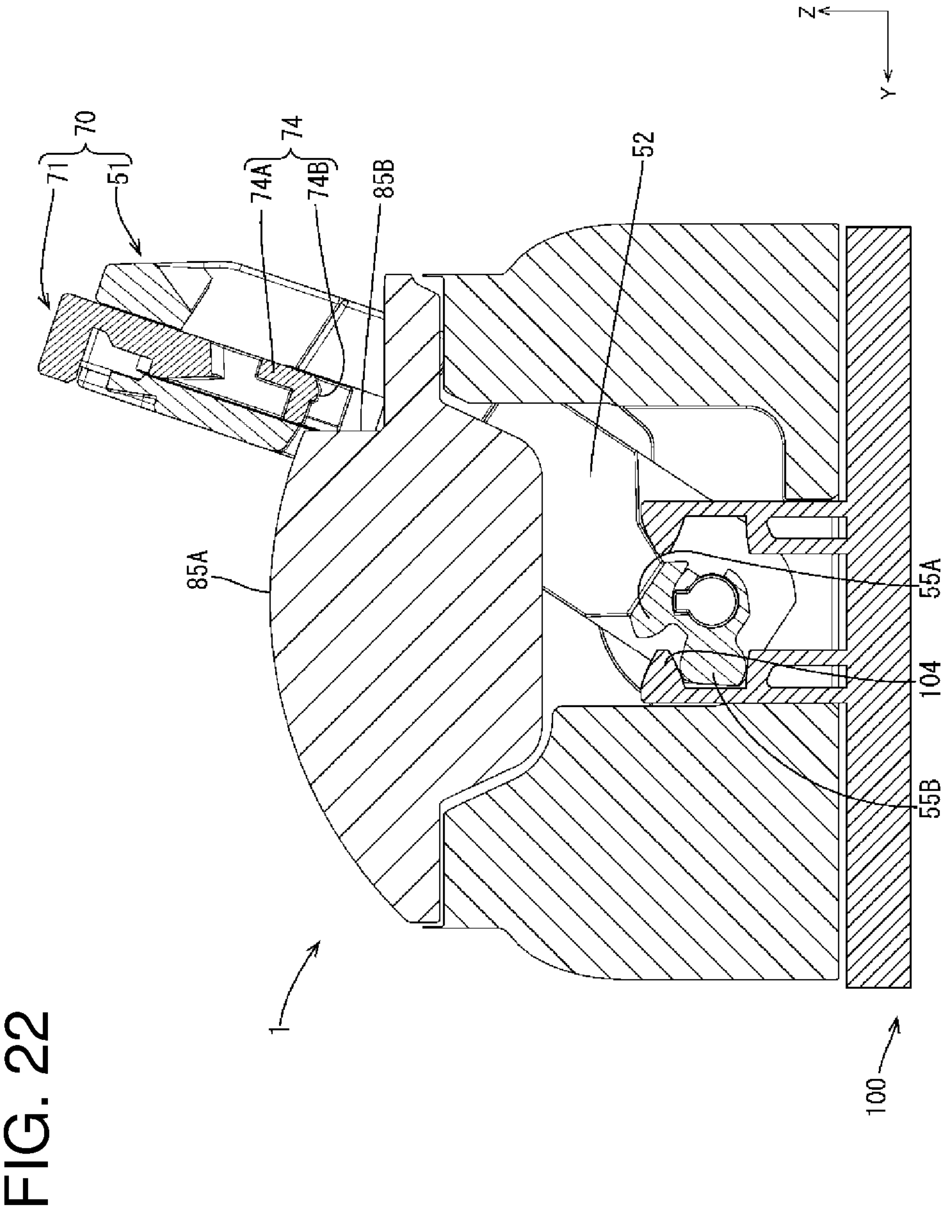
FIG. 22 is a section at the same position as D-D of FIG. 19 showing a state where the lever has reached a connection completion position.

The lever 50 is rotatable between a connection initial position (position shown in FIGS. 2 and 20) and a connection completion position (position shown in FIG. 22). At the connection initial position, the lever 50 is located near the first cover holding wall 33 in a posture oblique to the housing 10. At the connection completion position, the lever 50 is located near the second cover holding wall 34 in a posture oblique to the housing 10.

[Cover 80]

The cover 80 is a member to be assembled with the housing 10 to cover the first and second wire draw-out surfaces 20A, 31A and protect the wires W drawn out from the wire draw-out openings 21A. The cover 80 is made of synthetic resin and includes, as shown in FIGS. 13 and 14, a main wall 81 and two side walls 82 extending from the main wall 81.

Figure 13:
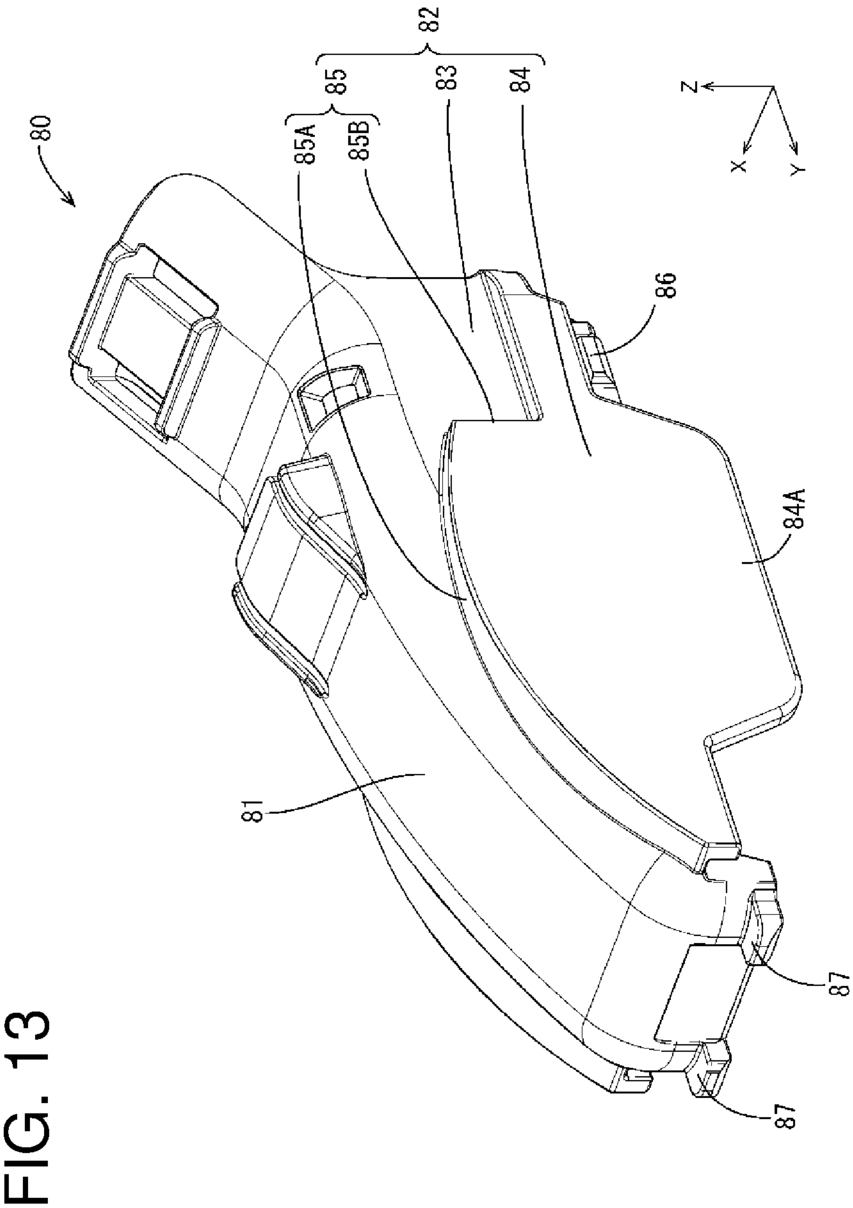
FIG. 13 is a perspective view of a cover of the embodiment.
Figure 14:
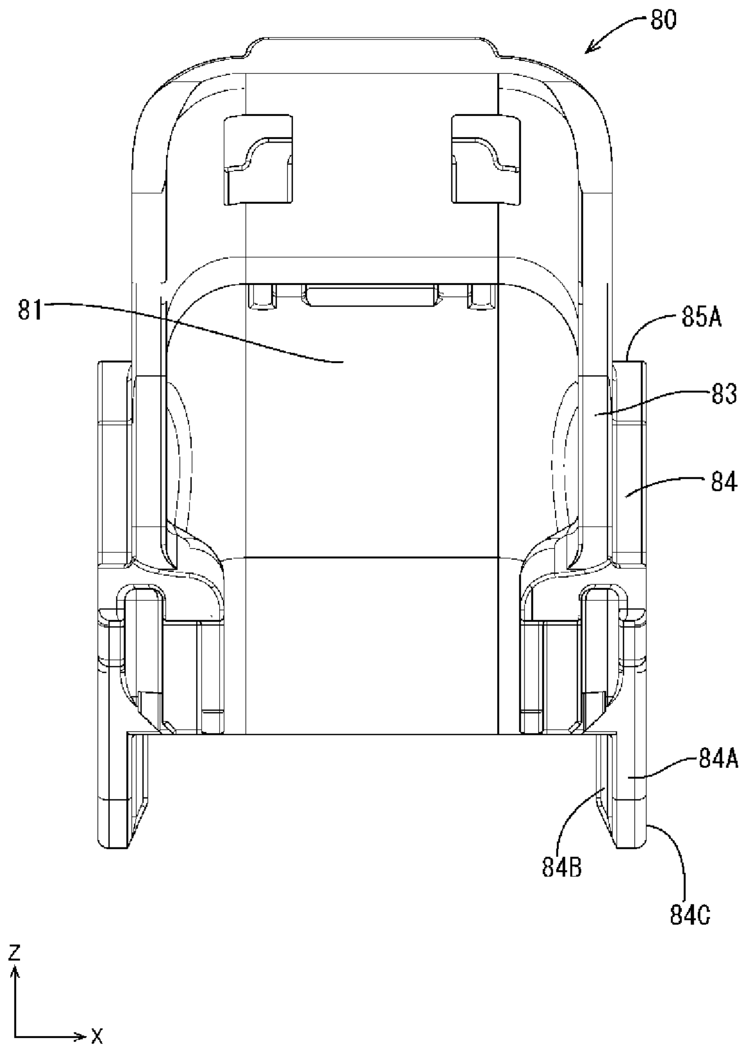
FIG. 14 is a front view of the cover of the embodiment.

As shown in FIGS. 13 and 14, the main wall 81 forms a shallow U-shaped groove as a whole and extends from one end (left-front end of FIG. 13) to be arranged adjacent to the first cover holding wall 33 while being smoothly curved.

The two side walls 82 respectively extend from two side edges of the main wall 81 and are disposed to face each other. Each side wall 82 includes a first side wall 83, a second side wall 84 and a step portion 85 linking the first and second side walls 83, 84. The second side wall 84 is arranged outwardly of the first side wall 83, i.e. more away from the mating side wall 82. The step portion 85 includes a guide receiving portion extending along a smooth arc from one end of the side wall 82 adjacent to the first cover holding wall 33 toward the other end on an opposite side and a final end portion extending away from the main wall 81 from an end part of the guide receiving portion 85A near the other end.

A part of the second side wall 84 serves an extended wall portion 84A. The extended wall portion 84A is, as shown in FIG. 3, a part extending along the terminal holding portion 11 from a position adjacent to the second wire draw-out surface 31A to a tip part (lower end part of FIG. 3) in the second side wall 84. In other words, the extended wall portion 84A is a part further extended along the terminal holding portion 11 from a part having a sufficient length to cover the wire draw-out surfaces 20A, 31A in the second side wall 84. As shown in FIGS. 3 and 14, the extended wall portion 84A has an inner surface 84B disposed along the terminal holding portion 11 and an outer surface 84C on an opposite side.

Figure 17:
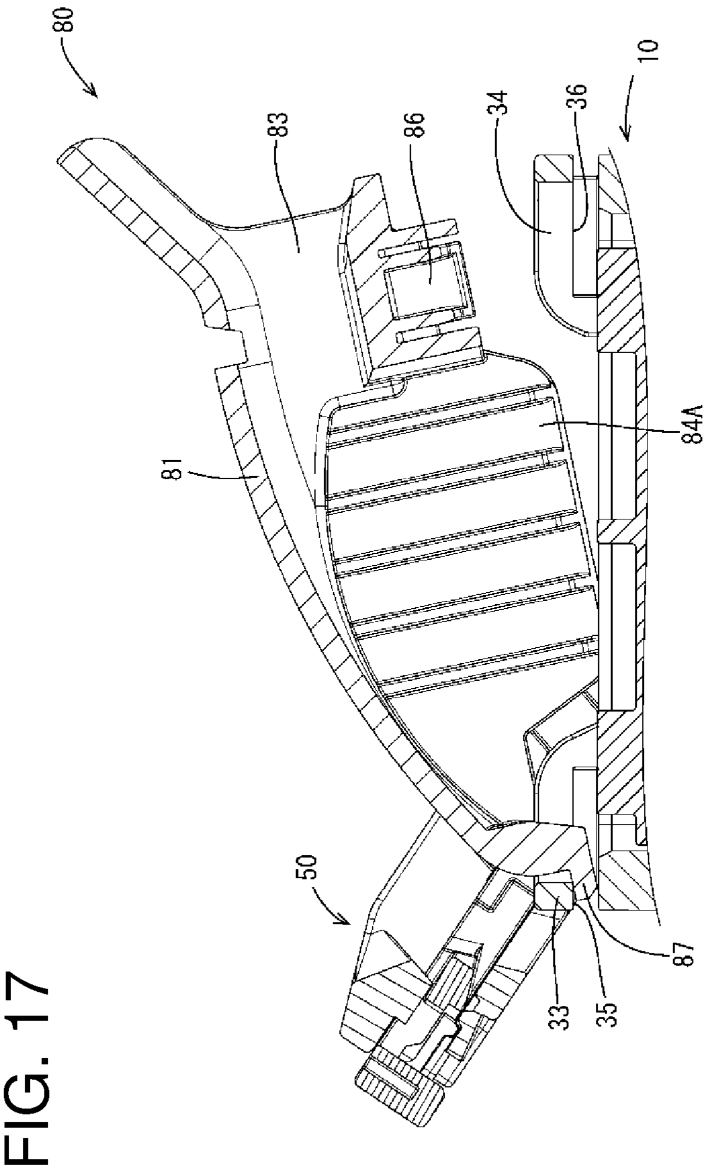
FIG. 17 is a partial enlarged section showing a state while the cover is being assembled with the housing in the embodiment.

The cover 80 includes two locking projections 87 and two locking pieces 86. Each locking projection 87 is a projection in the form of a plate piece projecting from one end of the main wall 81 and to be received into the locking hole 35 of the first cover holding wall 33 as shown in FIGS. 13 and 17. As shown in FIGS. 13 and 18, each locking piece 86 includes a locking piece body 86A connected to the side wall 82 and a locking claw 86B projecting from the locking piece body 86A and to be received into the locking recess 36 of the second cover holding wall 34.

[Mating Connector 100]

Figure 15:
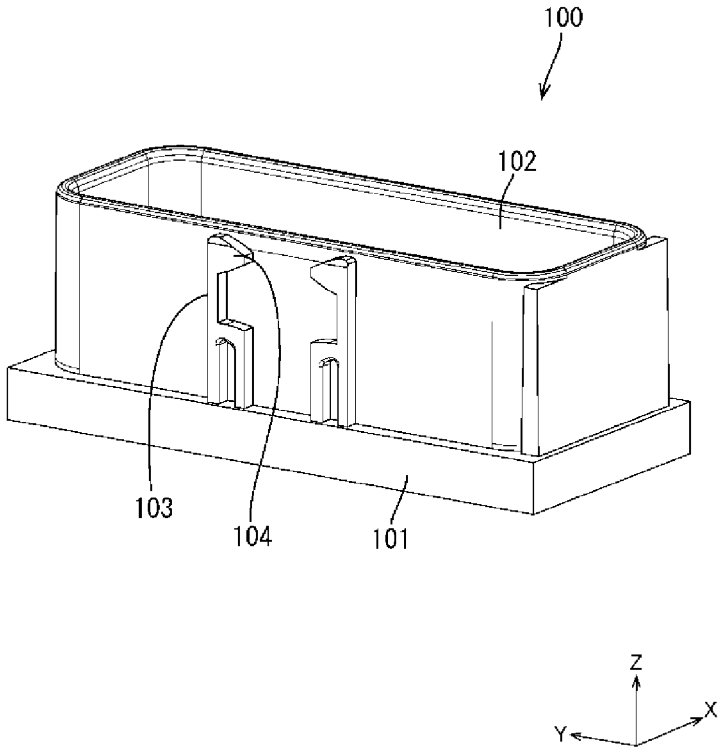
FIG. 15 is a perspective view of a mating connector of the embodiment.

As shown in FIG. 15, the mating connector 100 is provided with a bottom plate portion 101, a tubular receptacle 102 extending from the bottom plate portion 101 and two gear receiving portions 103 disposed on the outer surface of the receptacle 102 and corresponding to the two gear portions 55 respectively provided on the two leg portions 52 of the lever 50. Mating terminal fittings to be connected to the terminal fittings held in the lever-type connector 1 are held in the mating connector 100. Each gear receiving portion 103 includes gear projections 104 projecting from the outer surface of the receptacle 102 and to be meshed with the gear teeth 55A, 55B of the gear portion 55.

[Assembly of Lever-Type Connector 1]

An example of an assembling procedure of the lever-type connector 1 configured as described above is described below. First, the terminal fittings connected to the ends of the wires W are mounted into the inner housing 20. Subsequently, the inner housing 20 is mounted into the inner holding portion 31. The wires W are drawn out to outside from the wire draw-out openings 21A of the respective cavities 21 (see FIG. 4).

Subsequently, the lever 50 is assembled with the housing 10. As shown in FIG. 16, with the lever 50 set in as assembly posture perpendicular to the housing 10, the two leg portions 52 are deflected inwardly and the tip parts of the respective leg portions 52 are inserted into the respective lever accommodating portions 42. When the lever 50 is in the assembly posture, the positions of the passage recesses 54 disposed in the peripheral edge parts of the shaft holes 53 are aligned with the retaining projections 39 as shown in FIG. 16, wherefore the retaining projections 39 are allowed to pass through the passage recesses 54 and the entrance of the rotary shafts 38 into the shaft holes 53 is allowed. If the rotary shafts 38 are fit into the shaft holes 53, the respective leg portions 52 resiliently return and are disposed along the respective lever holding walls 37.

Thereafter, the lever 50 in the assembly posture is rotated to the connection initial position. There are gaps, into which the peripheral edge parts of the shaft holes 53 in the leg portions 52 enter, between the retaining projections 39 and the lever holding walls 37 (see FIG. 3). If the lever 50 is rotated to a position shifted from the assembly posture, the positions of the passage recesses 54 are not aligned with the retaining projections 39. Thus, the retaining projections 39 are engaged with the peripheral edge parts of the shaft holes 53 to restrict the separation of the lever 50 from the housing 10. In this way, the assembly of the lever 50 with the housing 10 is completed. The lever 50 is supported rotatably from the connection initial position to the connection completion position.

Subsequently, the cover 80 is assembled with the housing 10. First, as shown in FIG. 17, the cover 80 is set in an oblique posture in which the one end having the locking projections 87 is closer to the housing 10 than the other end, and the one end of the cover 80 is inserted into the inside of the first cover holding wall 33. By inserting the locking projections 87 into the locking holes 35, the locking projections 87 are locked to the first cover holding wall 33.

Subsequently, the cover 80 is so rotated about the locking projections 87 that the other end approaches the housing 10. At this time, the inner surfaces 84B of the respective two extended wall portions 84A are disposed along the terminal holding portion 11, whereby the assembly of the cover 80 with the housing 10 is guided (see FIG. 3). When the other end of the cover 80 reaches the second cover holding wall 34, the two locking pieces 86 are respectively pushed by the second cover holding wall 34 to be deflected inwardly. When the cover 80 is assembled at a proper position with respect to the housing 10, the two locking claws 86B are respectively received into the two locking recesses 36 and the two locking pieces 86 resiliently return and are locked to the second cover holding wall 34 as shown in FIG. 18. In the above way, the assembly of the lever-type connector 1 is completed.

[Connection of Lever-Type Connector 1 and Mating Connector 100]

Figure 19:
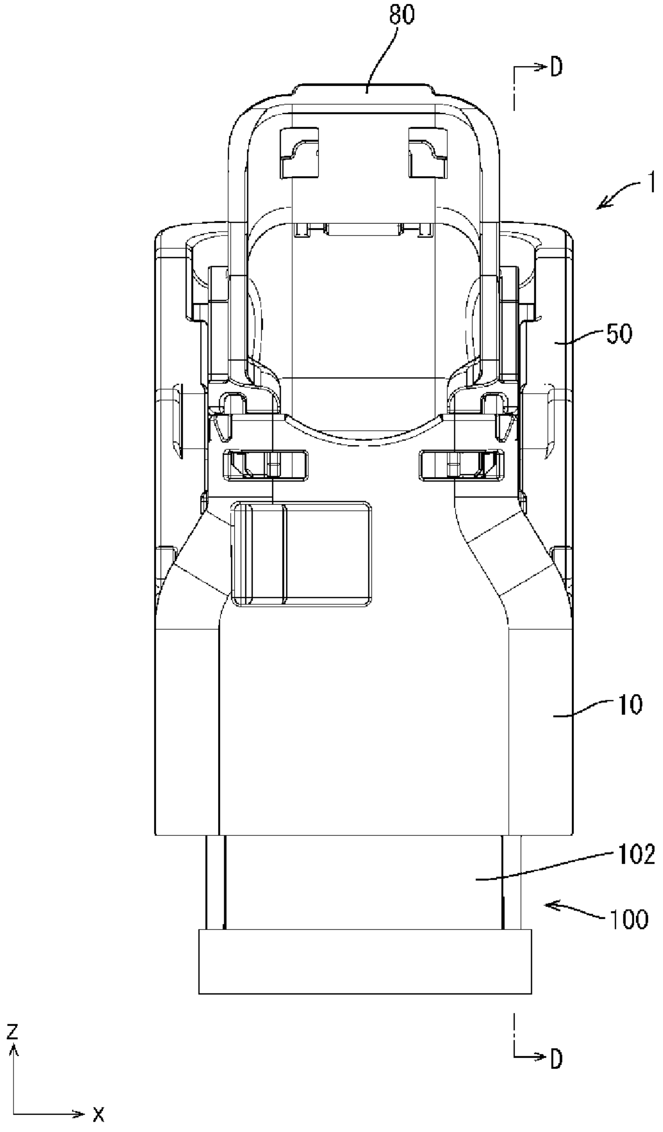
FIG. 19 is a front view showing a connection initial state of the lever-type connector and the mating connector.
Figure 20:
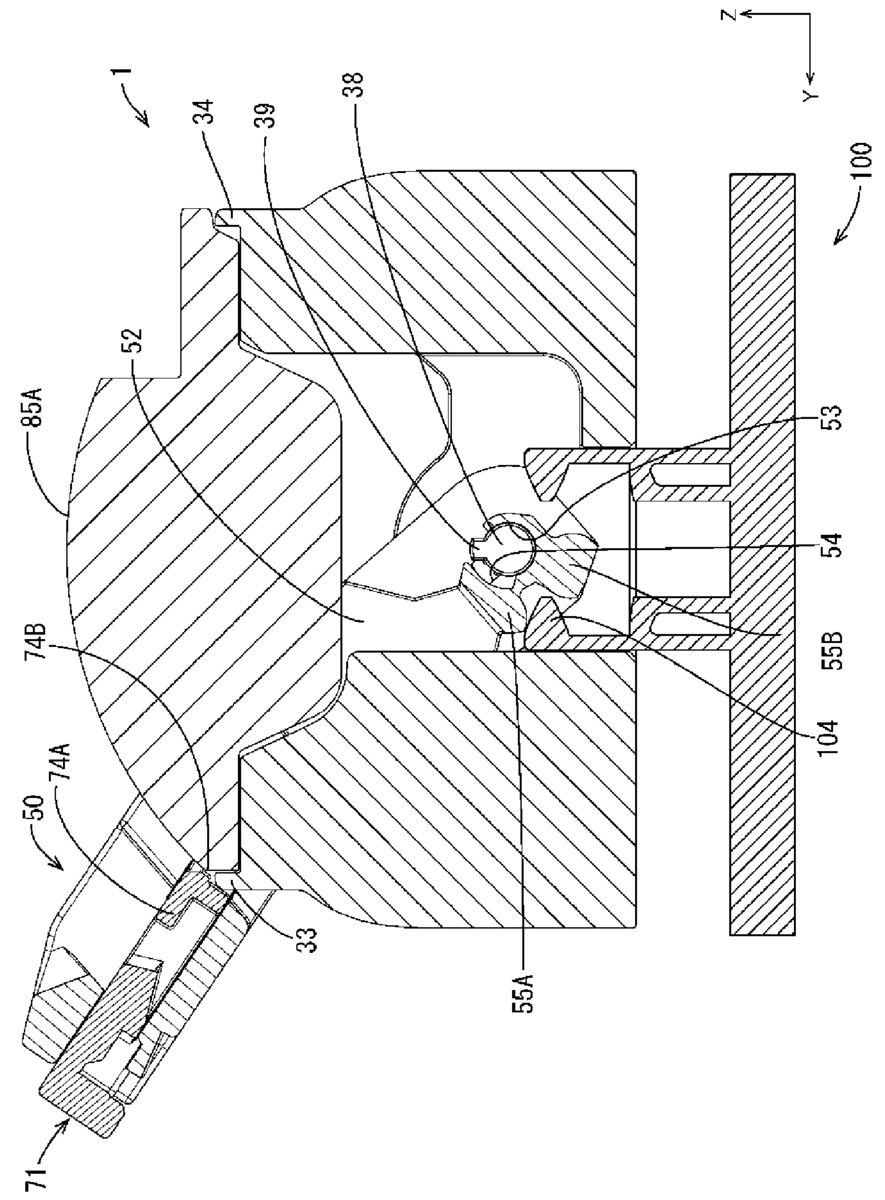
FIG. 20 is a section along D-D of FIG. 19.

Next, an example of a procedure of connecting the lever-type connector 1 configured as described above to the mating connector 100 is described below. First, as shown in FIGS. 19 and 20, with the lever 50 held at the connection initial position, the housing 10 is lightly fit to the mating connector 100 and a tip part of the receptacle 102 enters the connection space 41. With the lever 50 disposed at the connection initial position, the second gear tooth 55B closer to the connection opening 41A (lower side in FIG. 20), out of the two gear teeth 55A, 55B of each gear portion 55, is disposed to extend toward the connection opening 41A and the gear projection 104 can enter between the two gear teeth 55A and 55B as shown in FIG. 20. Further, each of the two contact portions 74B of the connection detecting member 71 is disposed on one end of each step portion 85 at the side of the first cover holding wall 33 and in contact with the guide receiving portion 85A.

Subsequently, the lever 50 is rotated from the connection start position to the connection completion position. At this time, the two contact portions 74B of the connection detecting member 71 respectively move while sliding in contact with the two guide receiving portions 85A, whereby the lever 50 is smoothly rotated. According to the rotation of the lever 50, the gear portions 55 rotate, the second gear teeth 55B move toward the back of the housing 10 and the gear receiving portions 103 engaged with the second gear teeth 55B are pulled to the back of the housing 10. Associated with this, the housing 10 is relatively pulled toward the mating connector 100 and the connection proceeds.

Figure 21:
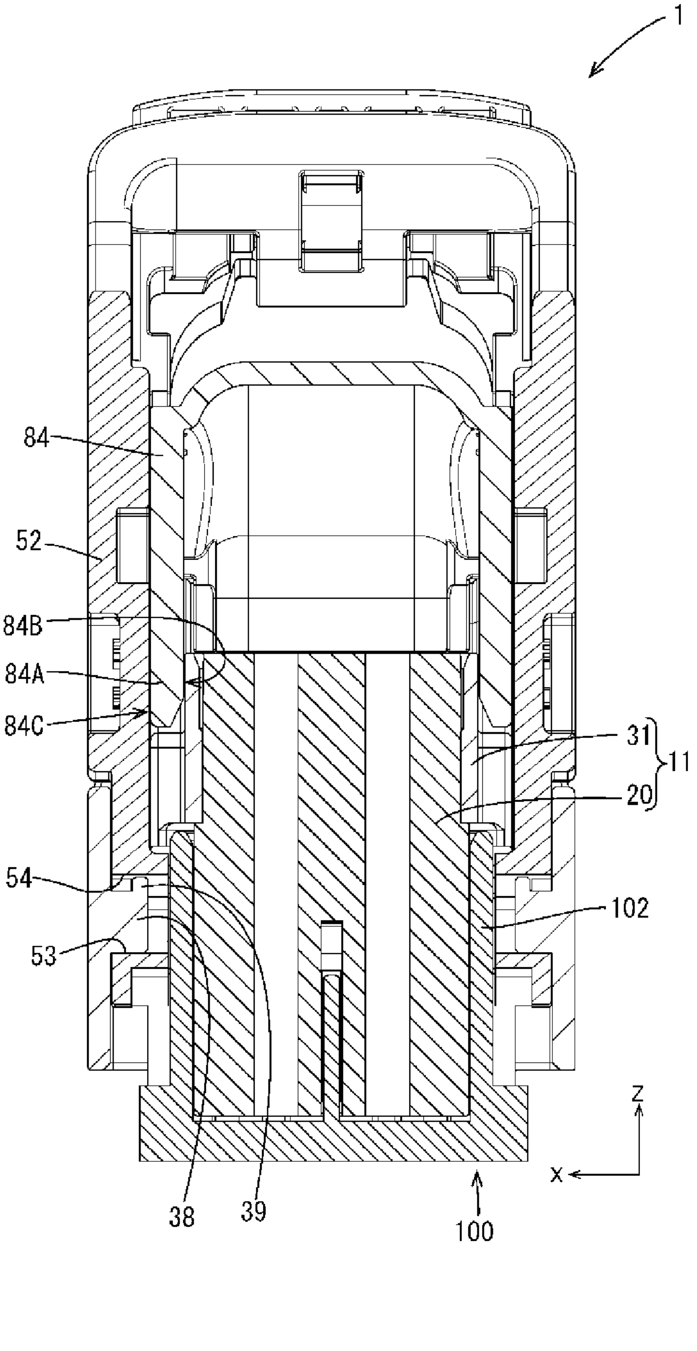
FIG. 21 is a section at the same position as A-A of FIG. 2 showing a state where the lever has reached an assembly position during the connection of the lever-type connector and the mating connector.

The lever 50 passes through an assembly position where the lever 50 is in the assembly posture while being rotated from the connection start position to the connection completion position. When the lever 50 just reaches the assembly position, the positions of the passage recesses 54 are aligned with the retaining projections 39 as shown in FIG. 21, wherefore the retaining projections 39 are allowed to pass through the passage recesses 54. Associated with this, the rotary shafts 38 are allowed to pass through the shaft holes 53. Thus, if the leg portions 52 of the lever 50 are easily deflected inwardly, i.e. in directions toward the terminal holding portion 11, for example, due to manufacturing tolerances or the like, there is a concern that the rotary shafts 38 and the retaining projections 39 pass through the shaft holes 53 and the passage recesses 54 and the lever 50 is detached from the housing 10 when the lever 50 just reaches the assembly position.

In this embodiment, parts of the two second side walls 84 of the cover 80 serve as the extended wall portions 84A to be disposed along the terminal holding portion 11. As shown in FIG. 21, the outer surface 84C of each extended wall portion 84A is disposed along each leg portion 52. When the leg portion 52 is about to be deflected inwardly, the outer surface 84C comes into contact with the leg portion 52 to suppress any further deflection of the leg portion 52. In this way, accidental detachment of the lever 50 is avoided.

When the lever 50 reaches the connection completion position, the housing 10 reaches a proper connection position with respect to the mating connector 100 as shown in FIG. 22. With the lever 50 disposed at the connection completion position, each of the two contact portions 74B of the connection detecting member 71 is disengaged from the guide receiving portion 85A. In this way, the connection detecting member 71 can be pushed from the standby position to the detection position. In contrast, if the lever has not reached the connection completion position, the connection detecting member 71 cannot be pushed to the detection position since the contact portions 74B are in contact with the guide receiving portions 85A. As just described, whether or not the lever 50 has been rotated to the connection completion position and the lever-type connector 1 and the mating connector 100 have reached the proper connection position can be judged based on whether or not the connection detecting member 71 can be pushed in.

Figure 23:
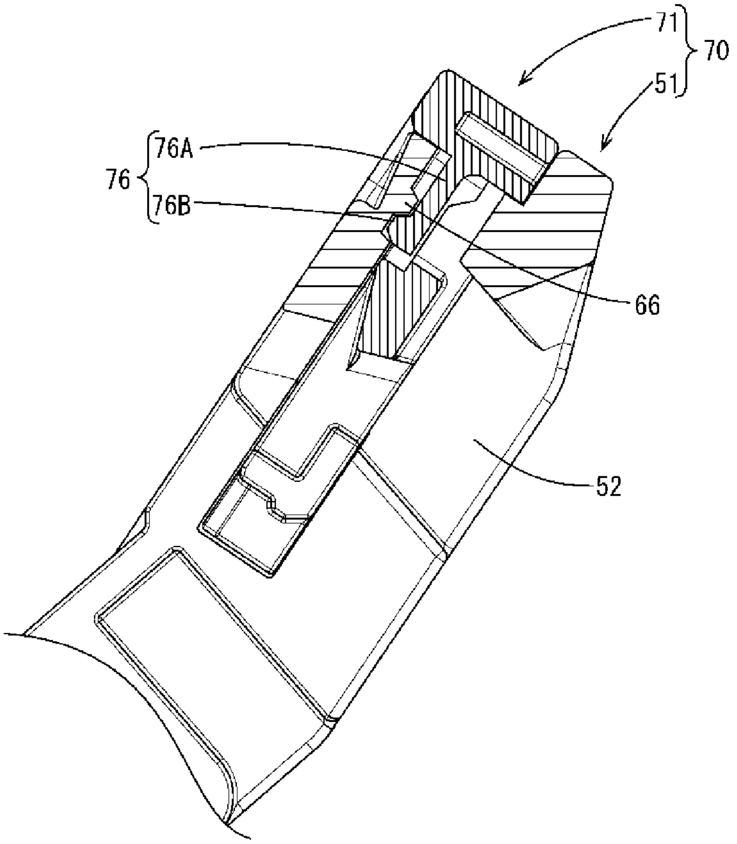
FIG. 23 is a partial enlarged section at the same position as B-B of FIG. 10 showing a state where the connection detecting member is pushed to a detection position.
Figure 24:
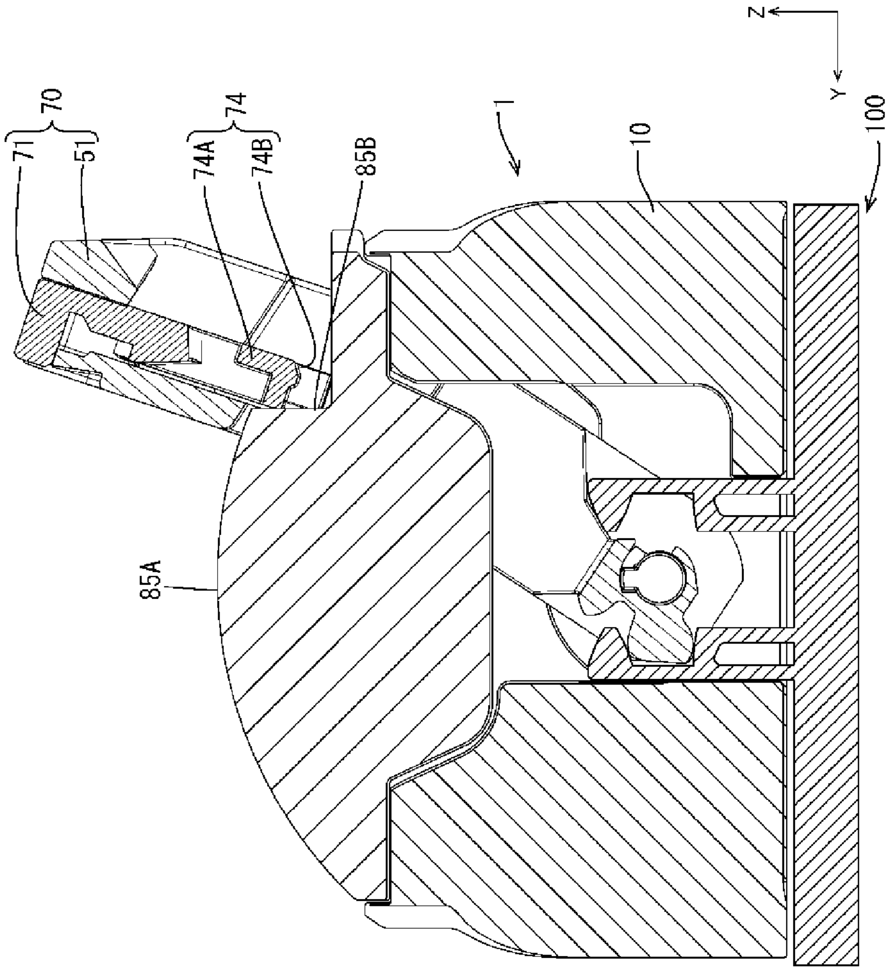
FIG. 24 is a section at the same position as D-D of FIG. 19 showing the state where the connection detecting member is pushed to the detection position.

After the lever 50 is set at the connection completion position, the connection detecting member 71 is pushed from the standby position to the detection position as shown in FIGS. 23 and 24. As shown in FIG. 23, the detecting claws 76B ride on the detecting projections 66 and the detecting pieces 76 are deflected. When the detecting claws 76B ride over the detecting projections 66, the detecting pieces 76 resiliently return and the detecting claws 76B are engaged with the detecting projections 66. In this way, the connection detecting member 71 is locked at the detection position. With the connection detecting member 71 locked at the detection position, the guide portions 74 are in contact with the final end portions 85B as shown in FIG. 24, whereby the rotation of the lever 50 to the connection initial position is restricted and the lever 50 is locked at the connection completion position. In this way, the connection of the lever-type connector 1 and the mating connector 100 is completed.

[Functions and Effects]

As described above, according to this embodiment, the lever-type connector 1 is provided with the housing 10 including the terminal holding portion 11 having the wire draw-out surfaces 20A, 31A and the cavities 21 open in the wire draw-out surfaces 31A, the lever holding walls 37 disposed on both sides of the terminal holding portion 11 and the rotary shafts 38 projecting from the lever holding walls 37 toward the terminal holding portion 11, the lever 50 including the leg portions 52 respectively disposed between the lever holding walls 37 and the terminal holding portion 11 and having the shaft holes 53 for receiving the rotary shafts 38, the lever 50 being rotatable from the connection initial position to the connection completion position, and the cover for covering the wire draw-out surfaces 20A, 31A by being assembled with the housing 10. The cover 80 includes the extended wall portions 84A extending along the terminal holding portion 11 from the positions adjacent to the wire draw-out surfaces 31A, and the extended wall portions 84A have the outer surfaces 84C for restricting the deformation of the leg portions 52 by coming into contact with the leg portions 52.

According to the above configuration, the outer surfaces 84C of the extended wall portions 84A come into contact with the leg portions 52 to restrict the deformation of the leg portions 52, whereby the detachment of the lever 50 is avoided in an unintended situation such as during the transportation or use of the lever-type connector 1 or during connection to the mating connector 100.

Further, the extended wall portion 84A has the inner surface 84B to be disposed along the terminal holding portion 11. According to this configuration, when the cover is assembled with the housing 10, the inner surfaces 84B of the extended wall portions 84A extend along the terminal holding portion 11, whereby the assembly of the cover 80 with the housing 10 is guided. Thus, the cover 80 can be smoothly assembled with the housing 10.

Further, the housing 10 includes the retaining projections 39 arranged adjacent to the projecting ends of the rotary shafts 38, projecting from the outer peripheral surfaces of the rotary shafts 38 and configured to restrict the separation of the rotary shafts 38 from the shaft holes 53 by locking the peripheral edge parts of the shaft holes 53 in the leg portions 52, and the lever 50 includes the passage recesses 54 communicating with the shaft holes 53 in the peripheral edge parts of the shaft holes 53 and configured to allow the passage of the retaining projections 39 only when the lever is at the assembly position between the connection initial position and the connection completion position.

In the above configuration, when the lever 50 is at the assembly position between the connection initial position and the connection completion position, the attachment and detachment of the lever 50 are allowed. In such a case, there is a concern that the lever 50 is detached while being rotated between the connection initial position and the connection completion position. In such a configuration, accidental detachment of the lever 50 during connection to the mating connector 100 is avoided if the configuration for restricting the deformation of the leg portions 52 by the extended wall portions 84A is applied.

Further, the lever 50 includes the guide receiving portions 85A, and the cover includes the guide portions 74 extending along rotation paths of the guide receiving portions 85A in rotating the lever 50 from the connection initial position to the connection completion position and configured to come into contact with the guide receiving portions 85A.

According to this configuration, the guide portions 74 are guided by the guide receiving portions 85A, whereby the lever 50 is smoothly rotated from the connection initial position to the connection completion position.

Further, the lever 50 includes the lever body 51 and the connection detecting member 71 to be assembled with the lever body 51 movably between the standby position and the detection position, the guide portions 74 are provided on the connection detecting member 71, the guide receiving portions 85A are arranged at such positions as to come into contact with the guide portions 74 to restrict a movement of the connection detecting member 71 from the standby position to the detection position when the lever 50 is at a position other than the connection completion position and not to be in contact with the guide portions 74 when the lever 50 is at the connection completion position.

According to this configuration, since the guide receiving portions 85A have both a function of guiding the rotation of the lever 50 and a function of restricting the movement of the connection detecting member 71 from the standby position to the detection position when the lever 50 is at a position other than the connection completion position, the configuration can be simplified.

Other Embodiments (1) Although the housing 10 is provided with the inner housing 20 and the outer housing 30 in the above embodiment, a housing may be composed of one member without including an inner housing and an outer housing.

(2) Although the guide receiving portion 85A is provided on the cover 80 in the above embodiment, a guide portion may be provided on a housing.

(3) Although the lever 50 is provided with the connection detecting member 71 in the above embodiment, a lever may not be provided with a connection detecting member.

LIST OF REFERENCE NUMERALS

1: lever-type connector
10: housing
11: terminal holding portion
20: inner housing
20A: first wire draw-out surface
21: cavity
21A: wire draw-out opening
30: outer housing
31: inner holding portion
31A: second wire draw-out surface
32: inner accommodating portion
33: first cover holding wall
34: second cover holding wall
35: locking hole
36: locking recess
37: lever holding wall
38: rotary shaft
39: retaining projection
41: connection space
41A: connection opening
42: lever accommodating portion
50: lever
51: lever body
52: leg portion
53: shaft hole
54: passage recess (recess)
55: gear portion
55A: first gear teeth
55B: second gear teeth
56: holding hole
57: slide groove
61: rotation operating portion
62: first bridging portion
63: second bridging portion
64: third bridging portion
65: detecting member accommodating portion
66: detecting projection
71: connection detecting member
72: arm
73: push-in operating portion
74: guide portion
74A: guide body
74B: contact portion
75: holding projection
76: detecting piece
76A: detecting piece body
76B: detecting claw
80: cover
81: main wall
82: side wall
83: first side wall
84: second side wall
84A: extended wall portion
84B: inner surface
84C: outer surface
85: step portion
85A: guide receiving portion
85B: final end portion
86: locking piece
86A: locking piece body
86B: locking claw
87: locking projection
100: mating connector
101: bottom plate portion
102: receptacle
103: gear receiving portion
104: gear projection
W: wire

What is claimed is:

1. A lever-type connector, comprising:

a housing including a terminal holding portion having a wire draw-out surface and a cavity open in the wire draw-out surface, lever holding walls disposed on both sides of the terminal holding portion and rotary shafts projecting from the lever holding walls toward the terminal holding portion;

a lever including leg portions disposed between the respective lever holding walls and the terminal holding portion and having shaft holes for receiving the rotary shafts, the lever being rotatable from a connection initial position to a connection completion position; and a cover for covering the wire draw-out surface by being assembled with the housing to enclose substantially an entire portion of the wire draw-out surface, the cover including a side wall, a part of the side wall serving as an extended wall portion extending along the terminal holding portion from a position adjacent to the wire draw-out surface, the extended wall portion having an outer surface for restricting deformation of the leg portion by coming into contact with the leg portion, the extended wall portion being shaped such that only a central part between both ends of the side wall extends toward the rotary shaft.

2. The lever-type connector according to claim 1, wherein the extended wall portion has an inner surface to be disposed along the terminal holding portion.

3. The lever-type connector according to claim 1, wherein:

the housing includes a retaining projection arranged adjacent to a projecting end of the rotary shaft, the retaining projection projecting from an outer peripheral surface of the rotary shaft, the retaining projection restricting separation of the rotary shaft from the shaft hole by locking a peripheral edge part of the shaft hole in the leg portion, and the lever includes a recess in the peripheral edge part of the shaft hole, the recess communicating with the shaft hole, the recess allowing passage of the retaining projection only when the lever is at an assembly position between the connection initial position and the connection completion position.

4. The lever-type connector according to claim 1, wherein:

the lever includes a guide portion, and the cover includes a guide receiving portion extending along a rotation path of the guide portion when the lever rotates from the connection initial position to the connection completion position, the guide receiving portion coming into contact with the guide portion.

5. The lever-type connector according to claim 4, wherein:

the lever includes a lever body and a connection detecting member to be assembled with the lever body movably between a standby position and a detection position, the guide portion being provided on the connection detecting member, and the guide receiving portion is disposed at such a position as to restrict a movement of the connection detecting member from the standby position to the detection position by coming into contact with the guide portion when the lever is at a position other than the connection completion position and not to be in contact with the guide portion when the lever is at the connection completion position.

* * * * *